United States Patent

Suwa et al.

[11] Patent Number: 6,101,453
[45] Date of Patent: Aug. 8, 2000

[54] METHOD AND APPARATUS FOR ANALYZING VIBRATION OF HOUSING OF DISK DEVICE

[75] Inventors: Masaya Suwa; Keiji Aruga, both of Kawasaki, Japan

[73] Assignee: Fujitsu Limited, Kawasaki, Japan

[21] Appl. No.: 09/044,609

[22] Filed: Mar. 19, 1998

[30] Foreign Application Priority Data

Oct. 8, 1997 [JP] Japan .................................. 9-275976

[51] Int. Cl.⁷ .................. G01H 17/00; G01M 19/00; G11B 33/12
[52] U.S. Cl. .................. 702/56; 360/69; 360/97.02; 73/570; 73/579
[58] Field of Search .................. 702/56, 76, 77, 702/141; 360/69, 97.02; 73/572, 579, 488, DIG. 1, 652, 1.37, 570

[56] References Cited

U.S. PATENT DOCUMENTS 4,967,293  5/1990  Aruga et al. .................. 360/78.12

FOREIGN PATENT DOCUMENTS 6464178   3/1989   Japan .
61198481  9/1989   Japan .
6290572   10/1994  Japan .

*Primary Examiner*—Marc S. Hoff
*Assistant Examiner*—Manuel L. Barbee
*Attorney, Agent, or Firm*—Greer, Burns & Crain, Ltd.

[57] ABSTRACT

A method and an apparatus for analyzing the vibration of the housing of a disk device are disclosed, in which the residual vibration of the housing can be accurately detected for protection against vibrations by determining the transfer function of the rotational acceleration of the housing. The vibration of the housing of the disk device attributable to a head actuator built into a computer or constituting a disk device housed in a locker is detected in such a manner that a random seek current is supplied to the head actuator from an external source, the transfer function of the rotational acceleration of the housing obtained from at least n acceleration sensor mounted on the housing is determined for each frequency, the spectrum of the random seek current supplied to the head actuator is multiplied by the transfer function of the housing, the resulting product is integrated twice thereby to convert the rotational acceleration into a displacement, the converted value of displacement thus obtained is multiplied by the servo follow-up error characteristic of the head actuator thereby to determine the power spectrum of the residual vibration in the frequency domain. The power spectrum is subjected to an inverse Fourier transformation thereby to detect the oscillation of the head with respect to time.

18 Claims, 11 Drawing Sheets

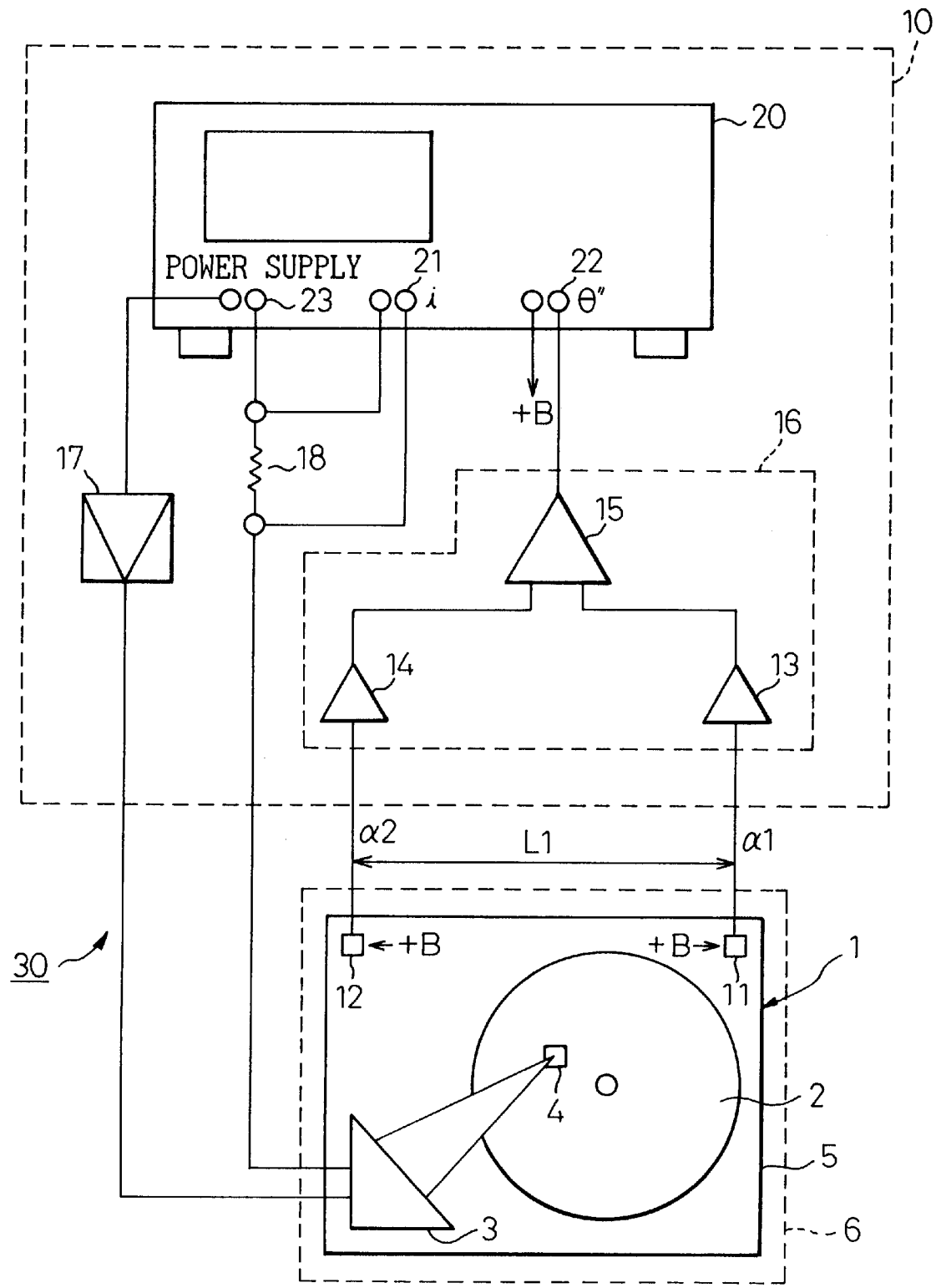

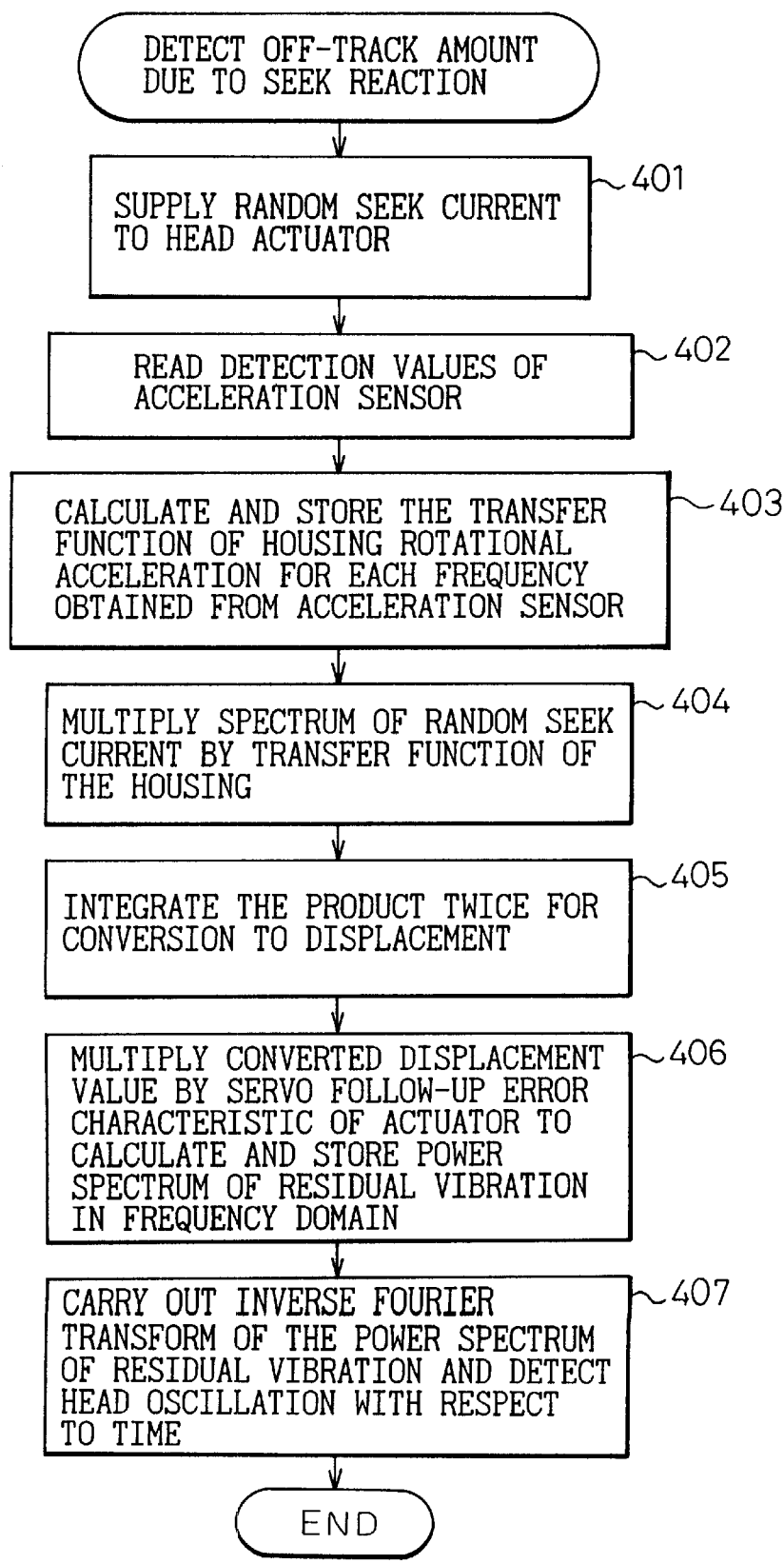

Fig.3A  VCM CURRENT SPECTRUM i 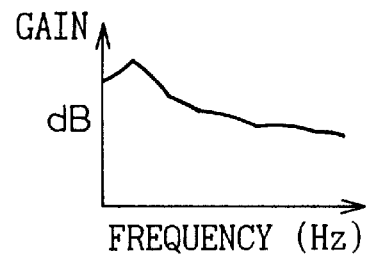
×
Fig.3B  TRANSFER FUNCTION $\theta''/i$ OF DE ROTATIONAL ACCELERATION 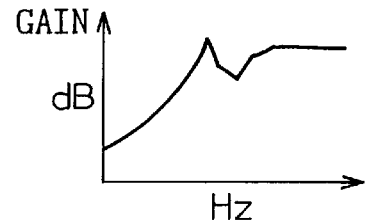
×
Fig.3C  INTEGRATE TWICE $\theta'' \rightarrow x$ 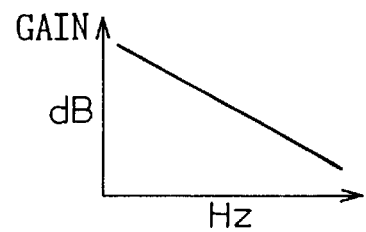
×
Fig.3D  SERVO FOLLOW-UP ERROR CHARACTERISTIC 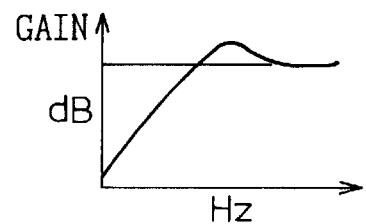
=
Fig.3E  POWER SPECTRUM OF RESIDUAL VIBRATION 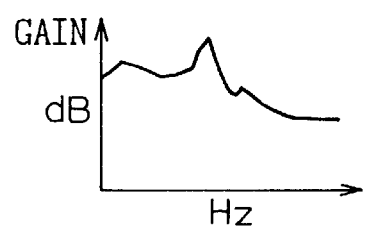
↓
Fig.3F  TEMPORAL WAVEFORM (INVERSE FOURIER TRANSFORM) 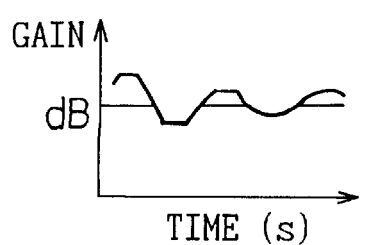

Fig.12

| | OFF-TRACK (BOX GAIN) AT 120 Hz | OFF-TRACK (BOX GAIN) AT 167 Hz | nrro3$\sigma$ |
|---|---|---|---|
| FREE SUPPORT | 0.023 [12.92] | 0.041 [12.10] | 0.671 |
| HIGH-RIGIDITY FRAME | 0.000 [-31.99] | 0.001 [-19.01] | 0.095 |
| SMALL-VIBRATION SLOT | 0.001 [-16.42] | 0.003 [-9.78] | 0.392 |

"OFF-TRACK" AND "nrro3$\sigma$" ARE GIVEN IN $\mu$m, AND "BOX GAIN" IN dB ($\mu$m/N.m)

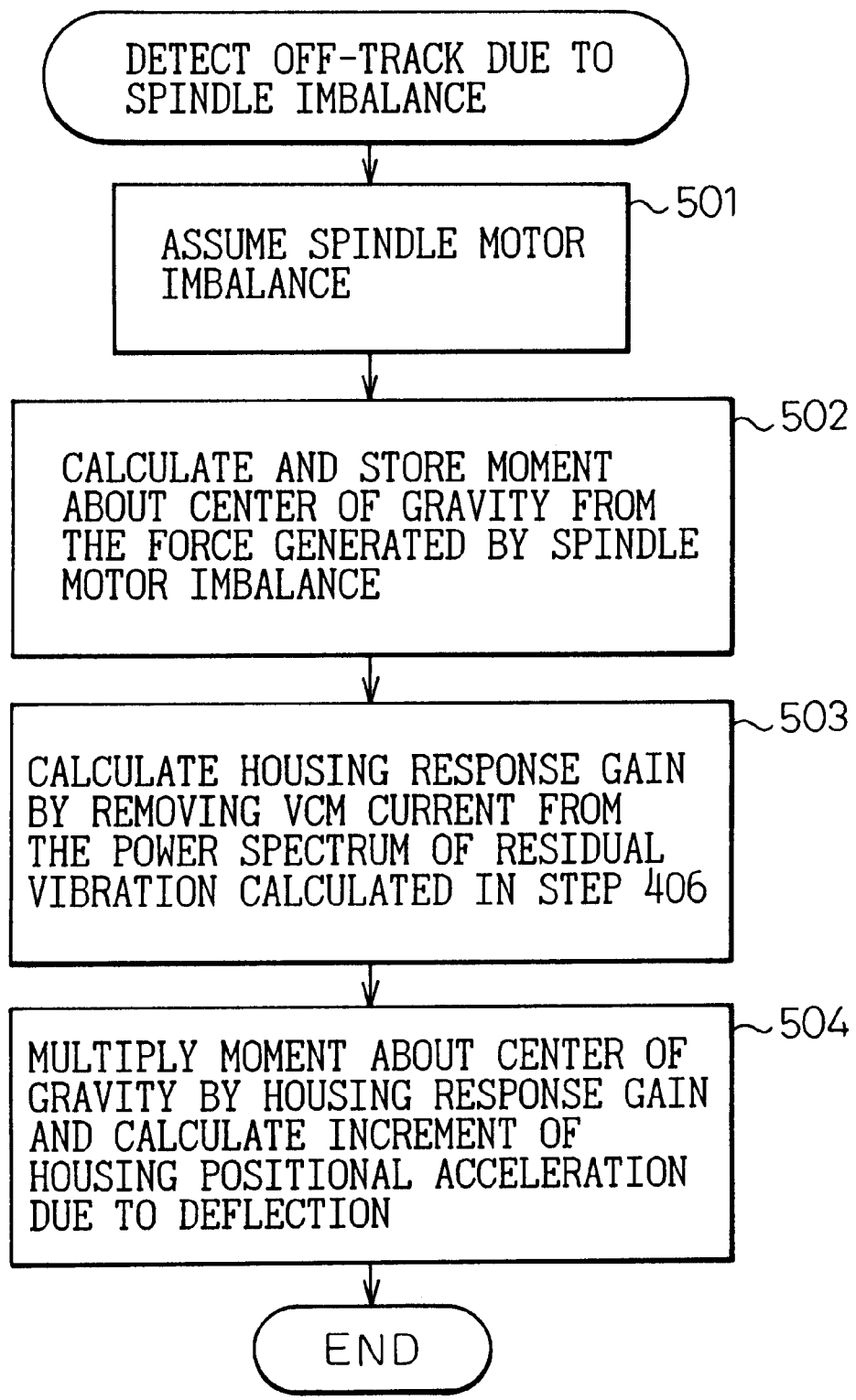

METHOD AND APPARATUS FOR ANALYZING VIBRATION OF HOUSING OF DISK DEVICE

BACKGROUND OF THE INVENTION

1. Field of the Invention

The present invention relates to a method and an apparatus for analyzing vibrations of the housing of a disk device or, in particular, to a method and an apparatus for analyzing vibrations of the housing of a disk device built into a computer, or a locker as an external storage unit for the computer, which vibrations are attributable to a head actuator of the disk device.

2. Description of the Related Art

With the recent increase in the storage capacity of a disk device such as a magnetic disk device used as a storage unit for a computer, the pitch of the data recording tracks (the reciprocal of TPI (Tracks Per Inch)) have been increasingly reduced. As a result, the allowable displacement of the head from an intended track on the magnetic disk (allowable off-track value) has become smaller than ever before. The allowable off-track value is affected also by the vibrations of the housing of the disk device in operation, and therefore it is critical to detect the vibrations of the housing of the disk device in operation. Accordingly, a superior method for analyzing the vibrations of the housing of the disk device is required.

A disk device is built into a computer in some cases. In other cases, however, a plurality of disk devices are used in juxtaposition in a rack (in a locker) external to the computer. In the disk devices used in juxtaposition in the locker, the off-track amount of the head is liable to be affected by the vibration characteristic of the locker depending on the conditions under which it is installed in the premises of the customer.

In order to obviate this problem, a protective measure against the vibrations of the disk device housing has conventionally been taken by mounting a vibration sensor on the locker for detecting the vibration characteristics of the locker.

However, the conventional measures for protection against the vibrations of the disk device housing are unsatisfactory in that the protective measures taken depend solely on the evaluation of the parallel displacement of the locker and the disk device housing.

In the conventional method of evaluating the vibrations of the housing of a disk device, a dummy disk device with a head capable of a seek operation is delivered to the customer, and the off-track amount of the head placed on track is measured. The housing is judged to have no problem if the off-track measurement is not more than a predetermined value on the order of microns. This conventional vibration evaluation method, however, cannot indicate the frequency of vibrations clearly and cannot take any anti-vibration measure in the case where the off-track amount exceeds a predetermined value.

The present inventors have studied this vibration problem of the conventional disk device housing, and have discovered that the locker vibrations originate not only from the motion thereof parallel to the disk devices but by the resonance of the housing caused by the reaction due to the rotation of the head actuator in the disk device. It has also been found that the metal plate of the housing resonates, and that the housing oscillates if fixed insufficiently, and that the rotational displacement of the housing is directly converted into a head oscillation to thereby increase the off-track amount.

SUMMARY OF THE INVENTION

The object of the present invention is to obviate the problem of the residual vibration of a conventional disk device and to provide a method and an apparatus, for analyzing the vibrations of the housing of a disk device, in which a current is supplied to a head actuator, the rotational acceleration of the disk device housing is measured with respect to the current, the transfer function of the rotational acceleration is determined, and the vibrations of the disk device housing can be accurately detected.

In order to achieve the above-mentioned object, according to the present invention, there is provided a novel method of analyzing the vibrations of the housing of a disk device and a novel apparatus for carrying out the method.

A method of analyzing the housing vibrations attributable to the head actuator of the disk device comprises a first step of supplying the head actuator with a random-seek current containing current components of various frequencies, with the phase thereof randomized by random numbers, from an external source, a second step of determining the transfer function of the rotational acceleration for each frequency obtained from an acceleration sensor mounted on the housing, a third step of multiplying the transfer function of the housing by the spectrum of the random seek current applied to the actuator, a fourth step of integrating twice the product obtained in the third step for conversion into a displacement, and a fifth step of multiplying the converted displacement value obtained in the fourth step by the servo follow-up error characteristic of the actuator thereby to determine the power spectrum of the residual vibrations in the frequency domain.

The method according to the invention can further comprise a sixth step of detecting the oscillation of the head with respect to time by inverse Fourier transformation of the power spectrum of the residual vibrations of the housing in the frequency domain.

In the method according to the invention, a dummy head can be mounted on the head mount of the head actuator.

In the method according to the invention, two acceleration sensors can be mounted on the housing so that the rotational acceleration of the housing obtained in the second step may be determined from the difference between the outputs of the two acceleration sensors.

Further, the method according to the invention can further comprise a seventh step of assuming an imbalance of the spindle motor for rotating the disk on the disk device, an eighth step of calculating the moment about the center of gravity from the force generated by the imbalance of the spindle motor, and a ninth step of determining an increment of the positional acceleration of the housing due to the deflection caused by the spindle imbalance.

An apparatus for analyzing the vibrations of the housing of a disk device attributable to the head actuator of the disk device comprises an acceleration sensor mounted on the housing and an excitation tester connected to the acceleration sensor, wherein the excitement tester includes means for generating a random seek current containing the current components of various frequencies, with the phase thereof randomized by random numbers, and supplying the random seek current to the head actuator, means for calculating the transfer function of the rotational speed of the housing obtained from the acceleration sensor for each frequency, means for multiplying the spectrum of the random seek current applied to the actuator by the transfer function of the housing, means for integrating the product of the spectrum of the random seek current and the transfer function of the housing twice for conversion into a displacement, and power spectrum calculation means for multiplying the converted displacement value by the servo follow-up error characteristic of the actuator thereby to determine the power spectrum of the residual vibration of the housing in the frequency domain.

In the apparatus according to the invention, the excitation detector can further comprise a head vibration characteristic detection means for detecting the oscillation of the head with respect to time by inverse Fourier transformation of the power spectrum of the residual vibrations of the housing in frequency domain.

The apparatus according to the invention can further comprise a dummy head mounted on the head mount of the head actuator.

In the case where the housing includes two acceleration sensors, the rotational acceleration of the housing is determined from the difference between the outputs of the two acceleration sensors.

Further, the excitation tester of the apparatus according to the invention can include means for assuming an imbalance of the spindle motor for rotating the disk of the disk device, means for calculating the moment about the center of gravity from the force generated by the imbalance of the spindle motor, and a positional acceleration correcting means for multiplying the moment about the center of gravity by the response gain of the housing and thus determining an increment of the positional acceleration of the housing due to the deflection caused by the spindle imbalance.

Furthermore, each means included in the excitation tester can be configured as computer software.

According to one aspect of the present invention, there is provided a method of analyzing the vibrations of the housing of a disk device, comprising a first step of supplying the head actuator with a random seek current containing current components of various frequencies from an external source, a second step of determining the transfer function of the rotational acceleration of the housing for each frequency, a third step of multiplying the spectrum of the random seek current by the transfer function of the housing, a fourth step of twice integrating the product obtained in the third step for conversion into a displacement, and a fifth step of multiplying the converted displacement value obtained in the fourth step by the servo follow-up error characteristic of the actuator, wherein the power spectrum of the residual vibrations of the housing in the frequency domain is obtained thereby to determine the vibrations and displacement of the housing.

Further, the sixth step of detecting the oscillation of the head with respect to time can detect the displacement of the head with respect to time.

In the case where a dummy head is mounted on the head mount of the head actuator, no seek error or no runaway is caused when an external disturbance is applied to the head actuator.

Also, provision of two acceleration sensors in the housing can determine the rotational acceleration of the housing accurately.

Further, the seventh step of assuming an imbalance of the spindle motor, the eighth step of calculating the moment about the center of gravity from the force generated by the imbalance of the spindle motor, and the ninth step of determining an increment of the positional acceleration of the housing due to the deflection caused by the spindle imbalance can determine the power spectrum of the housing in the frequency domain accurately.

According to another aspect of the invention, there is provided an apparatus for analyzing the vibrations of the housing of a disk device, wherein an excitation tester connected to an acceleration sensor includes current application means for supplying a random seek current to the head actuator, means for calculating the transfer function of the rotational acceleration of the housing for each frequency, means for multiplying the spectrum of the random seek current by the transfer function of the housing, means for twice integrating the product of the current spectrum of the random seek current and the transfer function of the housing for conversion into a displacement, and means for multiplying the converted displacement value by the servo follow-up error characteristic of the actuator and determining the power spectrum of the residual vibration of the housing in frequency domain, thereby facilitating the analysis of the vibration of the housing of the disk device.

Provision of the head vibration characteristic detection means for detecting the oscillation of the head with respect to time allows detection of the displacement of the head with respect to time.

Also, in the case where a dummy head is mounted on the head mount of the head actuator, a seek error or a runaway is prevented when the head actuator is exposed to an external disturbance.

Provision of two acceleration sensors in the housing permits the rotational acceleration of the housing to be determined from the difference between the outputs of the two acceleration sensors.

Furthermore, an accurate power spectrum of the residual vibration of the housing in frequency domain can be determined in the case where the excitation tester further includes means for assuming an imbalance of the spindle motor for rotating the disk of the disk device, means for calculating the moment about the center of gravity from the force generated by the imbalance of the spindle motor, and positional acceleration correcting means for multiplying the moment about the center of gravity by the response gain of the housing and determining an increment of the positional acceleration of the housing due to the deflection caused by the spindle imbalance.

In the case where each means included in the excitation tester is configured as computer software, the analysis of the vibrations of the housing of the disk device is facilitated.

BRIEF DESCRIPTION OF THE DRAWINGS

The present invention will be more clearly understood from the description as set forth below with reference to the accompanying drawings, wherein:

FIG. 1 is a diagram showing a configuration of an apparatus for analyzing vibrations of the housing of a disk device by a method according to an embodiment of the present invention;

FIG. 2 is a flowchart showing the steps of a method for analyzing the vibrations of the housing of a disk device according to the invention;

FIGS. 3A to 3F are waveform diagrams showing the steps of a method for analyzing the vibrations of the housing of a disk device according to the invention;

FIG. 12 is a table showing a comparison between the off-track amount of the head or the box gain and nrro3σ for each supporting condition associated with the housing oscillation at frequencies of 120 Hz and 167 Hz; and FIG. 13 is a flowchart showing the steps of detecting an off-track amount due to the spindle imbalance.

DESCRIPTION OF THE PREFERRED EMBODIMENTS

Figure 4:
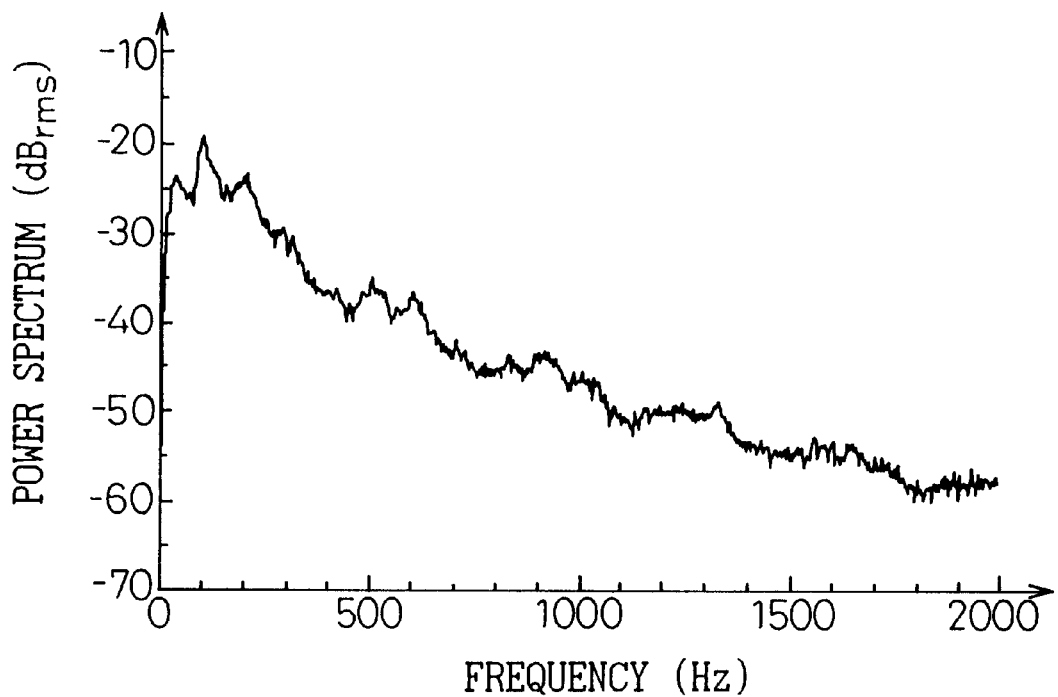
FIG. 4 is a diagram showing the waveform of FIG. 3A in detail and represents a waveform of the VCM current flowing at the time of random seek operation.

Embodiments of the present invention will be specifically explained with reference to the accompanying drawings. In explaining the embodiments, a magnetic disk device will be taken as an example of the disk device.

FIG. 1 is a diagram showing a configuration of an apparatus for analyzing the vibrations of the housing of a magnetic disk device for embodying a method according to the present invention.

A vibration analysis apparatus 30 according to this embodiment comprises acceleration sensors 11, 12 mounted on a housing 5 of a magnetic disk device 1, and an excitation tester 10 connected to the acceleration sensors 11, 12. The magnetic disk device 1 has a magnetic disk 2 built therein, and a head 4 mounted at the forward end of a head actuator (hereinafter referred to as the VCM or voice coil motor) 3 reads and writes data from and into the magnetic disk 2.

The magnetic disk device 1 for vibration analysis can be the one actually used in practical applications. A large external disturbance which may be applied to the VCM 3, however, causes a seek error or a runaway of the VCM 3. For this reason, the magnetic disk device 1 according to this embodiment includes a dummy head 4 in place of and having the same mass as the actual head 4. The magnetic disk device 1 configured this way is built in a computer or in a locker as an external memory unit of a computer. This embodiment assumes that the magnetic disk device 1 is housed in a locker 6.

An excitation tester 10 has built therein a charge amplifier 16, a power amplifier 17, a sense resistor 18 and a FFT (fast Fourier transform) analyzer 20. The charge amplifier 16 contains two amplifiers 13, 14 and a differential amplifier 15. The amplifiers 13, 14 amplify the detection outputs α1, α2 of the first and second acceleration sensors 11, 12, respectively, and apply the outputs thereof to the differential amplifier 15. The FFT analyzer 20 includes a pair of first input terminals 21, a pair of second input terminals 22 and a pair of power terminals 23.

One of the power terminals 23 is connected to one of the terminals of the VCM 3 through the power amplifier 17, and the other terminal 23 is connected to the other terminal of the VCM 3 through the sense resistor 18. According to this embodiment, the sense resistor 18 has a resistance value of 1Ω, and the terminals of the sense resistor 18 are connected to the first input terminals 21, respectively, of the FFT analyzer 20. One of the second input terminals 22 of the FFT analyzer 20 is connected to the two acceleration sensors 11, 12 through the charge amplifier 16 and is supplied with the detection values of the rotational acceleration of the housing 5 detected by the two acceleration sensors 11, 12 and the charge amplifier 16.

The FFT analyzer 20 houses therein, though not shown, such circuits as a current application circuit for generating a random seek current containing current components of various frequencies, with the phase thereof randomized by random numbers, and producing the random seek current from a power terminals 23, an arithmetic processing circuit for analyzing the signals input thereto from the input terminals 21, 22, and a memory for storing the transfer function of the housing 5 and the servo follow-up error characteristic of the VCM 3.

The operation of the vibration analysis apparatus 30 for the disk device housing having the above-mentioned configuration will be explained with reference to the case of detecting an off-track state of the head 4 caused by the seek reaction which in turn occurs when the VCM 3 of the magnetic disk device 1 performs a seek operation. Reference is made to FIGS. 2 to 11.

FIG. 2 is a flowchart of the process for executing the method of vibration analysis using the vibration analysis apparatus 30 for the housing 5 of the disk device 1 shown in FIG. 1.

First, in step 401, a random seek current is supplied from the FFT analyzer 20 through the power amplifier 17 to the VCM 3. This random seek current is produced in such a manner as to contain current components of various frequencies with the phase randomized by random numbers. This random seek current flows through the sense resistor 18 having a resistance value of 1Ω. By detecting the voltage across the sense resistor 18, therefore, the current spectrum of the random seek current applied to the VCM 3 can be detected by the FFT analyzer 20.

Step 402 reads the difference between the detection values α1, α2 of the two acceleration sensors 11, 12 mounted on the housing 5 of the magnetic disk device 1. Specifically, the detection values α1, α2 of the two acceleration sensors 11, 12 are amplified in the amplifiers 13, 14 of the charge amplifier circuit 16 and then the difference between the two detection values is calculated by a differential amplifier 15. This difference is applied from one of the second input terminals 22 to the FFT analyzer 20.

In step 403, the transfer function of the rotational acceleration of the housing 5 is calculated and stored for each frequency in the FFT analyzer 20 based on the difference between the detection values α1, α2 of the two acceleration sensors 11, 12. The rotational acceleration of the housing 5 is calculated by dividing the difference between the detection values α1, α2 of the acceleration sensors 11, 12 by the distance L1 between the two acceleration sensors 11, 12.

According to this embodiment, the acceleration sensors 11, 12 are monoaxial, and therefore the rotational acceleration is detected from the difference between the detection values of the two acceleration sensors 11, 12. However, one acceleration sensor mounted on the housing 5 of the magnetic disk device 1 is sufficient, if it is capable of detecting rotational acceleration.

In step 404, the current spectrum of the random seek current detected in step 401 and applied to the VCM 3 is multiplied by the transfer function of the rotational acceleration of the housing 5 calculated in step 403, followed by step 405 for integrating the resulting product twice, thereby performing a conversion into displacement.

In step 406, the converted displacement value obtained in step 405 is multiplied by the servo follow-up error characteristic of the VCM 3, and the power spectrum of the residual vibration in frequency domain is calculated and stored. The servo follow-up error characteristic of the VCM 3 is measured and stored in the FFT analyzer 20 beforehand.

FIGS. 3A to 3F are schematic diagrams showing waveforms for explaining the process followed in the vibration analysis method for the disk device housing described in FIG. 2.

According to a vibration analysis method for the disk device housing according to this invention, the spectrum i of the current supplied to the VCM 3 shown in FIG. 3A is multiplied by the transfer function $\theta''/i$ of the rotational acceleration of the housing (DE: Disk Enclosure) 5 shown in FIG. 3B, and then the resulting product is integrated twice as shown in FIG. 3C to thereby convert the acceleration into the displacement of the head position. The displacement thus obtained is multiplied by the servo follow-up error characteristic shown in FIG. 3D thereby to produce the power spectrum of the residual vibration in the frequency domain as shown in FIG. 3E. After that, this power spectrum of the residual vibration is subjected to inverse Fourier transformation, thus producing a displacement waveform of the head, with respect to time, as shown in FIG. 3F.

FIG. 4 shows the waveform of FIG. 3A in detail. This waveform represents the VCM current supplied at the time of a random seek operation. A current is supplied to the VCM 3 for each frequency. According to the present invention, therefore, the current associated with the random seek operation of the VCM 3 averaged in the frequency domain is supplied to the VCM 3 as a random seek current at the time of vibration analysis. The current spectrum of this random seek current (VCM current) can be obtained by measuring the voltage across the sense resistor 18 as described above.

Figure 5:
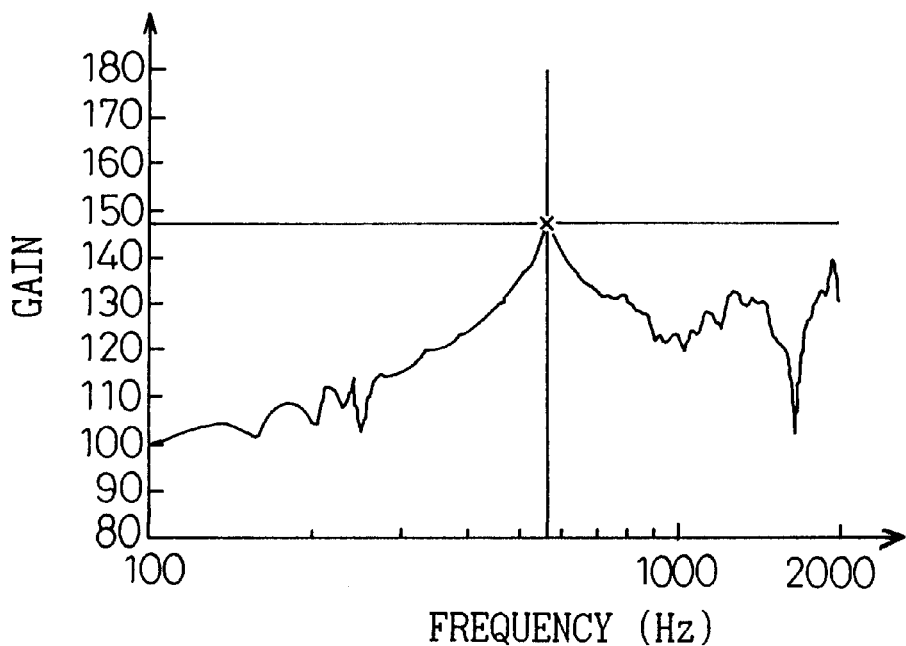
FIG. 5 is a diagram showing the waveform of FIG. 3B in detail and represents the characteristic of the transfer function of the DE rotational acceleration.

FIG. 5 is a diagram showing the waveform of FIG. 3B in detail and represents the transfer function characteristic of the rotational acceleration of the DE (housing) 5. As described above, the rotational acceleration of the DE 5 can be produced from the detection values of the two acceleration sensors 11, 12. Let the detection values of the two acceleration sensors 11, 12 be $\alpha1(G/A)$ and $\alpha2(G/A)$, the rotational radius of the head be rh (m), the distance between the two acceleration sensors be d (m) and the moment of inertia of the DE 5 be J (kg·mm$^2$). Then, the transfer function of the rotational acceleration C can be obtained as follows.

$$X=[(\alpha1-\alpha2)\times rh] \div (d\times J)(m/s^2/a)$$

This value represents the vibration characteristic of the DE 5 with respect to the rotational acceleration when the magnetic disk device 1 is mounted on the locker 6. FIG. 5 shows an example of such vibration characteristic.

Figure 6:
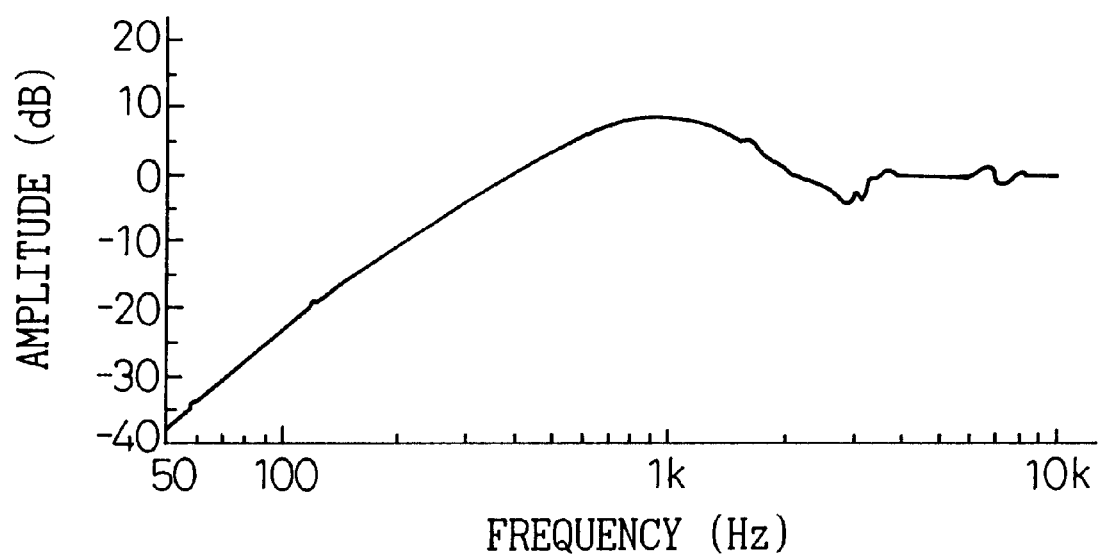
FIG. 6 is a diagram showing the waveform of FIG. 3D in detail and represents an example of the servo followup error characteristic.

FIG. 6 shows the waveform of FIG. 3D in detail and represents an example of the follow-up error characteristic of the servo motor. The servo follow-up error characteristic is expressed as the degree in $\mu$m to which the amplitude of 1 $\mu$m at which the head is vibrating can be compressed by the servo motor. This value varies from one magnetic disk device 1 to another. Therefore, the servo follow-up error characteristic is measured and stored in the FFT analyzer 20 in advance.

Figure 7:
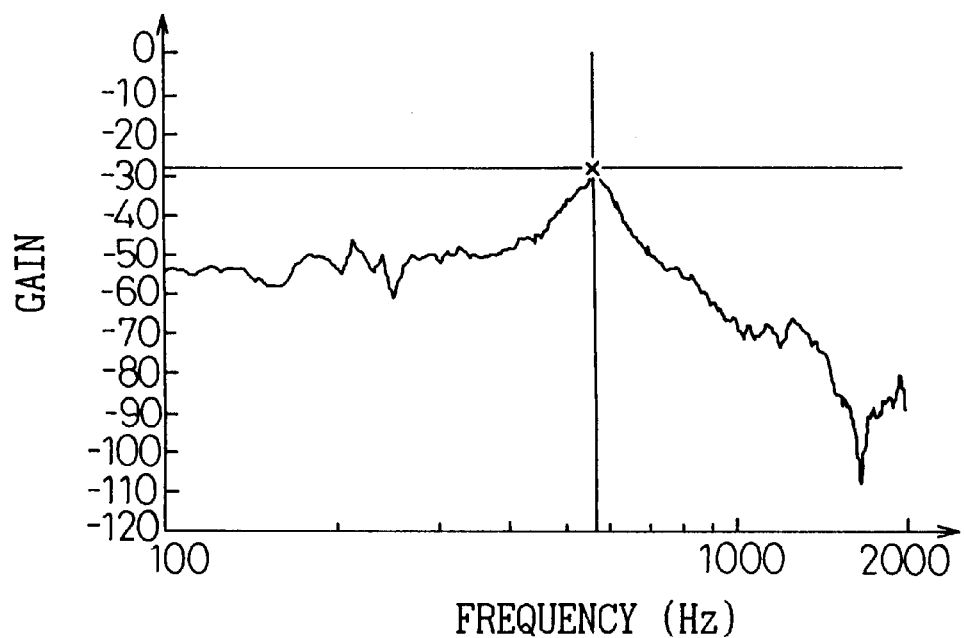
FIG. 7 is a diagram showing the waveform of FIG. 3E in detail and represents a power spectrum of the residual vibration.

FIG. 7 shows the waveform of FIG. 3E in detail, and represents the power spectrum of the residual vibration of the DE 5. The power spectrum indicates the off-track amount caused by the seek reaction of the VCM 3. The off-track state of the head position can be determined by observing the power spectrum of the residual vibration of the DE 5. Assuming that a given frequency has a large peak in the power spectrum of the residual vibration with the DE 5 securely fixed, the portion of the locker 6 containing the DE 5 oscillating at the particular frequency is detected, and a damper or a damping mass is attached to the oscillating portion for protection against the vibrations of the DE 5.

The resonance point of the DE 5 varies depending on the rigidity of the locker or the like on which the DE 5 is mounted. The DE 5 always vibrates the locker 6 with a certain energy. Therefore, it is critical how to suppress the resonance point in the locker 6. When a given portion of the locker 6 is oscillating with a power spectrum having a peak at 100 Hz, for example, a different damping material is mounted on the locker than when the same portion of the locker 6 is oscillating with a power spectrum having a peak at 200 Hz. In the case where the frequency has a high peak in the power spectrum, the vibration can be suppressed by a comparatively light damping mass. The vibration of a frequency with a power spectrum having a low peak value, in contrast, cannot be stopped without a heavy damping mass. In other words, a damping mass or a reinforcement is required in accordance with the frequency of the power spectrum.

In the above-mentioned method of analyzing the vibrations of the disk device housing, the conditions for an increased residual vibration can be determined by changing the width of the current spectrum supplied to the VCM 3 for each reference or by analyzing scores of power spectra having different seek intervals. Thus, the method according to the present invention is suitably used for finding a portion which easily succumbs to resonance.

Figure 8:
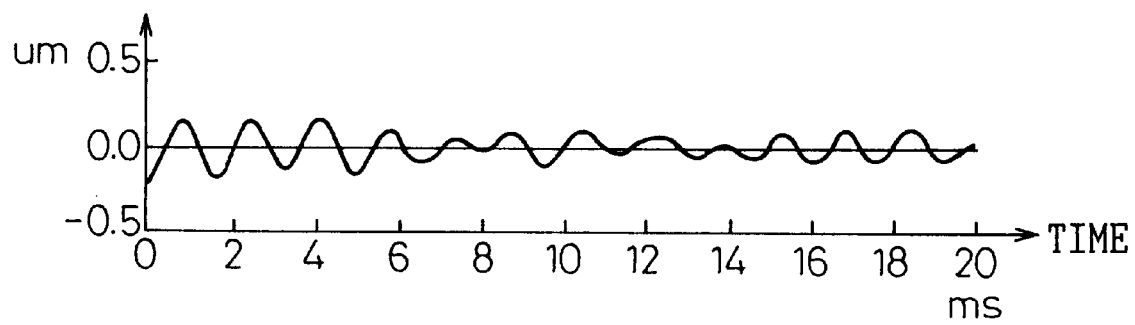
FIG. 8 is a diagram showing the waveform of FIG. 3F in detail and represents the oscillation of the head position with respect to time.

FIG. 8 shows the waveform of FIG. 3F in detail and represents the oscillation of the head position with respect to time. The waveform shown in FIG. 8 is produced by converting the power spectrum of FIG. 7 into a displacement by inverse Fourier transform, and by first calculating the sine wave with an amplitude of −60 dB (0 dB corresponds to 1 $\mu$m) at 100 Hz. At the next point, the sine wave is overlapped at 101 Hz, and at the next point but one, the sine wave is overlapped at 102 Hz. In this way, the sine waves are added successively by overlapping. Then, at last, the direction in which the head position oscillates can be determined with respect to time. In other words, the characteristic of FIG. 8 represents the displacement (oscillation) of the head 4 with respect to time.

Consider the case where all the waveforms overlapped are sine waves. In the case where waveforms of different frequencies are overlapped, the portion of the waveforms having a maximum amplitude has an increased amplitude. Actually, however, all currents have a random phase. According to this embodiment, therefore, random numbers are generated to randomize the phase of the sine wave of each frequency. By thus dispersing the maximum frequency, a substantially normal characteristic is obtained. When the phases of the sine waves of various frequencies are combined, the amplitude is large at some point and small at another, resulting in a waveform having large temporal ups-and-downs. Such a problem is solved by randomizing the phase.

Figure 9:
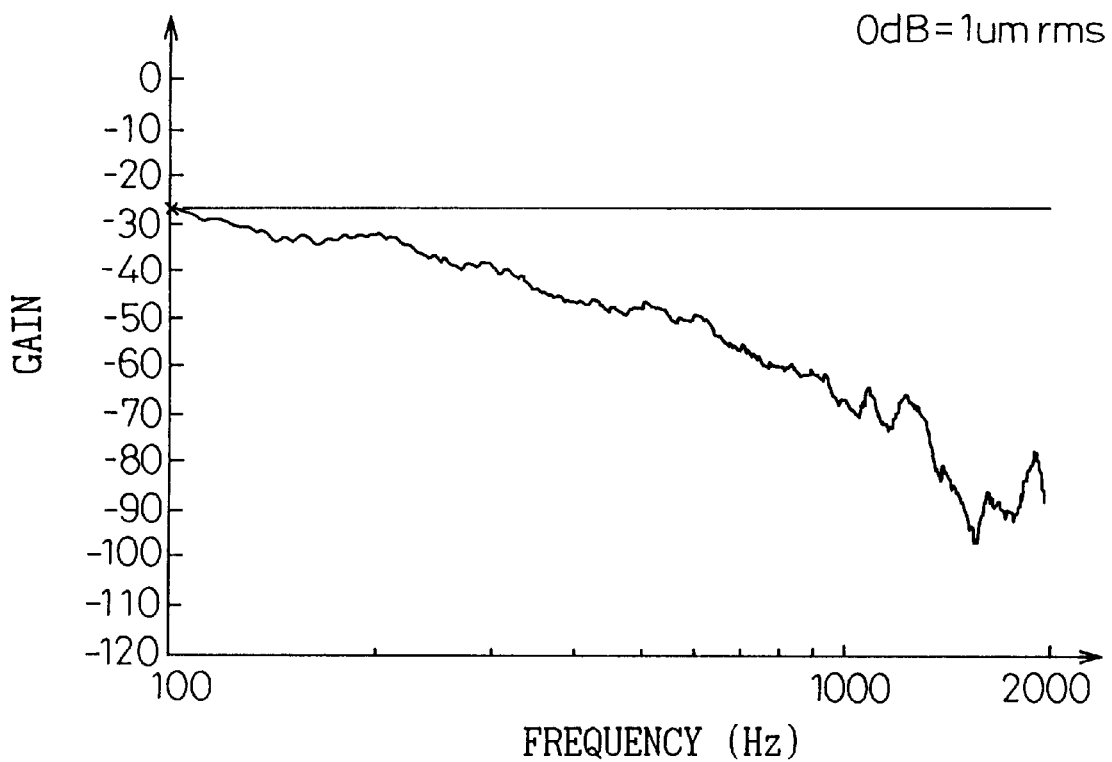
FIG. 9 is a diagram showing a power spectrum obtained when the housing is supported in free form.
Figure 10:
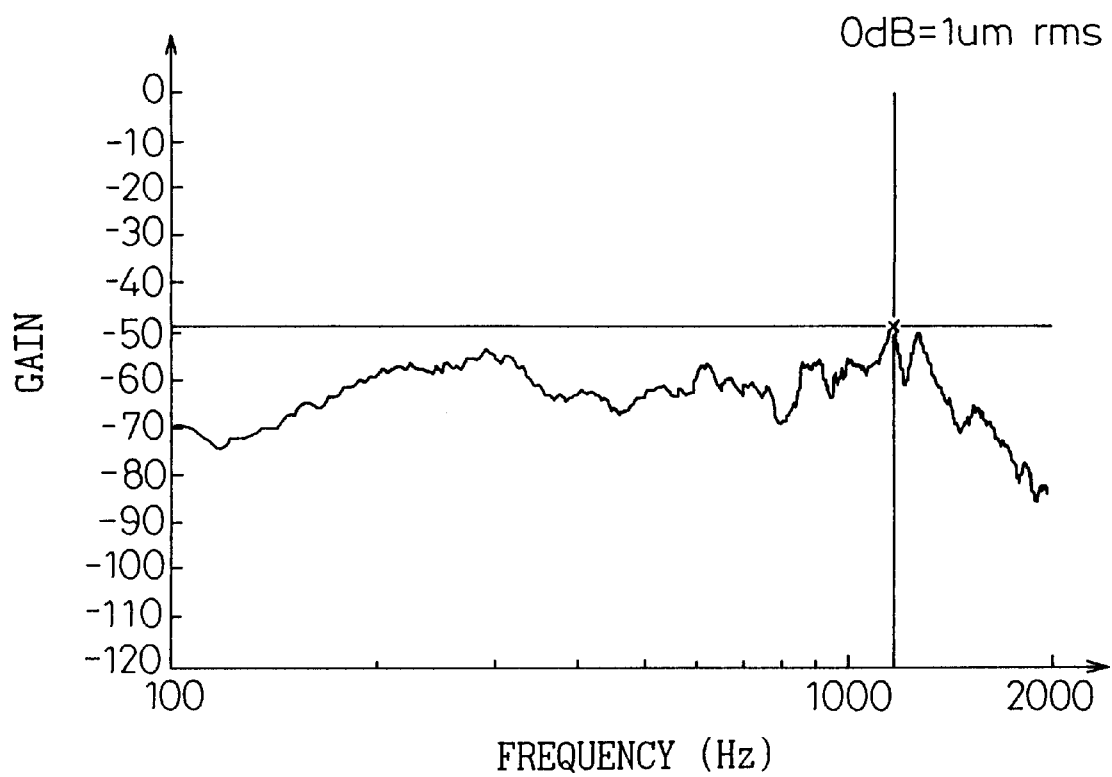
FIG. 10 is a diagram showing a power spectrum obtained when the housing is supported on a high-rigidity frame.
Figure 11:
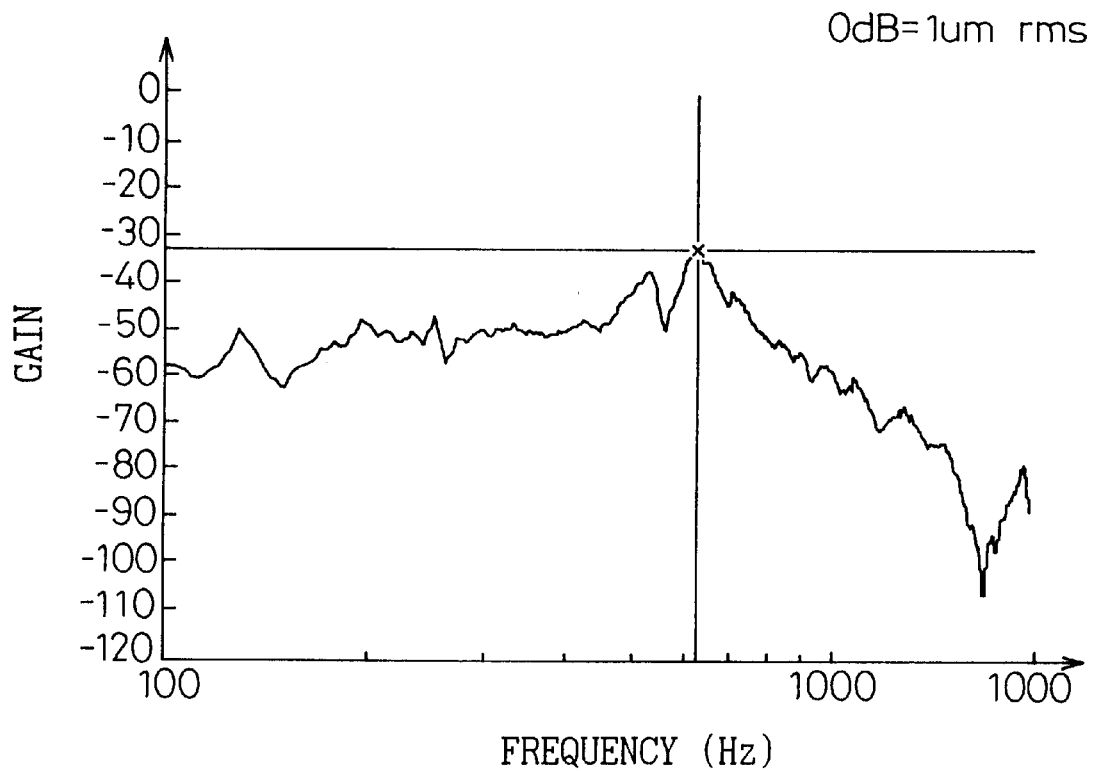
FIG. 11 is a diagram showing a power spectrum obtained when the housing is supported in a small-vibration slot.

FIG. 9 is a diagram showing a power spectrum obtained when the DE 5 is supported freely; FIG. 10 is a diagram showing a power spectrum obtained when the DE 5 is supported on a high-rigidity frame; and FIG. 11 is a diagram showing a power spectrum obtained when the DE 5 is supported in a slot with a small vibration of the tester.

From these diagrams, it is seen that the power spectrum in low-frequency range is suppressed to flat in the case where the DE 5 is supported on a high-rigidity frame (FIG. 10). In the case where the DE 5 is placed upright on a sponge completely free of support (FIG. 9), on the other hand, the low-frequency range of the power spectrum is maintained at a high level. Consequently, when the power spectrum is converted into the displacement, the low-frequency range represents a larger head displacement.

These power spectra are used to detect the off-track amount and the box gain of the head associated with the frequency 120 Hz of the DE 5 (the frequency associated with the spindle rotational speed of 7200 rpm), and also to detect the off-track amount, the box gain and nrro3σ associated with the frequency 167 Hz of the DE 5 (the frequency associated with the spindle rotational speed of 10033 rpm). The result is obtained as shown in FIG. 12.

The box gain represents the head off-track amount with respect to the rotational excitation, and nrro3σ represents an envelope reproduced in such a way that the power spectrum is converted into displacement and converted once again along the time axis, the ±AC components are overlapped with respect to zero, and then the dispersion from the center is tripled.

As seen from FIG. 12, the off-track amount and the box gain assume a larger value, i.e., the displacement is smaller for the high-rigidity frame, the small-vibration slot and free-of-support state in that order. The values of nrro3σ, on the other hand, are such that the displacement is 0.671 μm when the DE 5 is free of support and 0.095 μm when the DE 5 is fixed using a high-rigidity frame. It is noted from these values of nrro3σ that it possible to determine the degree of deterioration of the positioning accuracy (the worse, the larger the numerical value) of the head mounted in the locker as compared with when the DE 5 is securely fixed. In other words, overall judgment is possible as to whether a given locker vibration characteristic is proper or not depending on the value of nrro3σ.

There are two factors causing the rotational vibration to be applied to the DE 5. One of them is the power spectrum constituting a reaction when the actuator performs a seek operation as described above, and the other is the spindle imbalance caused by the deflection of the spindle motor. This spindle imbalance is a single frequency proportional to the rotational speed of the spindle. The spindle motor driven at 7200 rpm develops a spindle imbalance at 120 Hz, and the spindle motor rotating at 10033 rpm develops a spindle imbalance at 167 Hz, for example.

FIG. 13 is a flowchart showing the process of detecting the off-track amount based on the spindle imbalance.

The spindle imbalance is a characteristic obtained in such a way that the servo follow-up error characteristic is multiplied by the rotational acceleration of the DE 5 and the VCM current is removed from the product. This characteristic indicates the manner in which the DE 5 is displaced under a given rotational torque. The vibration analysis of the disk device housing can be evaluated from another direction using this spindle imbalance value. Specifically, in view of the fact that the spindle imbalance causes rotation about the center of the DE 5, the rotational torque of the DE 5 can be calculated by determining the amount of spindle imbalance and the distance from the rotational center of the DE 5. The displacement of the customer's locker corresponding to the amount of spindle imbalance can be determined by multiplying the amount of spindle imbalance by the response characteristic of the DE 5. It becomes thus easier to take a protective measure against any resonance which may occur.

Step 501 assumes that the spindle motor for rotating the disk of the magnetic disk device 1 is unbalanced. In step 502, the moment $mr\omega^2 l_2$ about the center of gravity of the DE 5 is calculated from the force $mr\omega^2$ generated by the imbalance of the spindle motor.

In step 503, the current component supplied to the VCM 3 is subtracted from the power spectrum value of the residual vibration calculated in step 406 to calculate the response gain of the DE 5. In step 504, the moment $mr\omega^2 l_2$ about the center of gravity determined in step 502 is multiplied by the response gain of the DE 5 thereby to determine the increment of the positional acceleration of the DE 5 due to the deflection caused by the spindle imbalance.

The rotational speed of the spindle motor is included in the parameters of the rotational excitation due to the spindle imbalance. In many cases, therefore, the actual rotational excitation due to the spindle imbalance is used for calculations in the FFT analyzer and is not displayed.

As described above with reference to embodiments, the present invention provides a system to examine the manner in which the DE 5 of the magnetic disk 1 vibrates. Although the configuration of the devices shown in the embodiments uses the excitation tester 10 having the charge amplifier 16 and the FFT analyzer 20, the excitation tester 10 can alternatively be configured of a computer. A computer is capable of easily processing complex numbers. Graphical data that have otherwise been calculated by the FFT analyzer 20 and displayed on the oscillograph (not shown) can be internally calculated in the computer and displayed as graphics on the display screen in simple fashion. When such a computer is used, the control process described with reference to FIGS. 2 and 13 is stored in memory as software.

The above-mentioned embodiments concern a method and an apparatus for analyzing the vibrations of the housing of the magnetic disk device. The disk device according to the present invention is not limited to a magnetic disk device, but the invention is also applicable with equal effect to an optical disk device.

Also, description is made above with reference to embodiments in which a movable disk device system is taken as an object of the test. For example, a disk array system was explained in which a plurality of magnetic disk devices are each housed in a locker and are each adapted to be pushed in or pulled out individually. The present invention is also applicable, however, to the case in which a single locker is used, i.e., to the case in which a single magnetic disk device is housed in the computer.

As described above, the vibration analysis method for the housing of a disk device according to the present invention has the following effects:

(1) The power spectrum of the residual vibration of a housing in frequency domain can be determined from the detection values of the rotational speed of the housing obtained by supplying a random seek current containing currents of various frequencies to a VCM from an external source. The vibration and displacement of the housing can thus be determined.

(2) The displacement of a head with respect to time can be detected.

(3) A dummy head prevents a seek error or runaway from occurring when the VCM is exposed to external disturbances.

(4) The use of two acceleration sensors can accurately determine the rotational acceleration of the housing.

(5) It is possible to determine an increment of the positional acceleration of the housing due to the deflection caused by the spindle imbalance, and therefore, the power spectrum of the residual vibration of the housing in the frequency domain can be determined more accurately.

Also, the vibration analysis apparatus for the housing of a disk device according to the present invention has the following effects:

(1) The vibrations of the housing of the disk device can be easily analyzed.

(2) The displacement of the head with respect of time can be detected.

(3) The use of a dummy head prevents a seek error or runaway from occurring when the VCM is exposed to external disturbances.

(4) Since two acceleration sensors are used, the rotational acceleration of the housing can be determined more accurately.

(5) In view of the fact that it is possible to determine an increment of the positional acceleration of the housing due to the deflection caused by the spindle imbalance, the power spectrum of the residual vibration of the housing in frequency domain can be determined more accurately.

(6) Since an excitation tester is configured as computer software, the vibration analysis of the disk device housing is facilitated.

What is claimed is:

1. A method of analyzing the vibration of the housing of a disk device attributable to a head actuator, comprising:

a first step of supplying a random seek current containing current components of various frequencies with the phases thereof randomized by random numbers to said head actuator from an external source;

a second step of determining the transfer function of the rotational acceleration of said housing obtained for each frequency from an acceleration sensor mounted on said housing;

a third step of multiplying the current spectrum of the random seek current supplied to said actuator by said transfer function of said housing;

a fourth step of integrating the product obtained in the third step twice and converting the rotational acceleration to a displacement; and a fifth step of multiplying the converted displacement value obtained in the fourth step by the servo follow-up error characteristic of said actuator and determining a power spectrum of the residual vibration in the frequency domain.

2. A method of analyzing the vibration of the housing of a disk device according to claim 1, further comprising a sixth step of detecting the oscillation of said head with respect to time by carrying out an inverse Fourier transformation of the power spectrum of the residual vibration of said housing in the frequency domain.

3. A method of analyzing the vibration of the housing of a disk device according to claim 2, wherein a dummy head is mounted on the head mount of said head actuator.

4. A method of analyzing the vibration of the housing of a disk device according to claim 3, wherein two acceleration sensors similar to said first acceleration sensor are arranged in said housing, and wherein the rotational acceleration of said housing obtained in said second step is determined from the difference between the outputs of said two acceleration sensors.

5. A method of analyzing the vibration of the housing of a disk device according to claim 4, further comprising:

a seventh step of assuming an imbalance of the spindle motor for rotating the disk of said disk device;

an eighth step of calculating the moment about the center of gravity from the force generated by the imbalance of said spindle motor; and a ninth step of multiplying said moment about the center of gravity by the response gain of said housing and thus determining an increment of the positional acceleration of said housing due to the deflection caused by said spindle imbalance;

wherein an off-track amount of the head due to said spindle imbalance is detected in said seventh to said ninth steps.

6. A method of analyzing the vibration of the housing of a disk device according to claim 1, wherein a dummy head is mounted on the head mount of said head actuator.

7. A method of analyzing the vibration of the housing of a disk device according to claim 1, wherein two acceleration sensors similar to said first acceleration sensor are arranged in said housing, and wherein the rotational acceleration of said housing obtained in said second step is determined from the difference between the outputs of said two acceleration sensors.

8. A method of analyzing the vibration of the housing of a disk device according to claim 1, further comprising:

a sixth step of assuming an imbalance of the spindle motor for rotating the disk of said disk device;

an seventh step of calculating the moment about the center of gravity from the force generated by the imbalance of said spindle motor; and a eighth step of multiplying said moment about the center of gravity by the response gain of said housing and thus determining an increment of the positional acceleration of said housing due to the deflection caused by said spindle imbalance;

wherein an off-track amount of the head due to said spindle imbalance is detected in said sixth to said eighth steps.

9. An apparatus for analyzing the vibration of the housing of a disk device attributable to a head actuator, comprising at least an acceleration sensor mounted on said housing and an excitation tester connected to said acceleration sensor, wherein said excitation tester includes:

current application means for generating a random seek current containing current components of various frequencies with the phase thereof randomized by random numbers and supplying said random seek current to said head actuator;

means for calculating the transfer function of the rotational acceleration of said housing for each frequency obtained from said acceleration sensor;

means for multiplying the spectrum of the random seek current supplied to said actuator by the transfer function of said housing;

means for integrating said product twice and thus converting said rotational acceleration into a displacement; and means for multiplying said converted displacement value by the servo follow-up error characteristic of said actuator and calculating the power spectrum of the residual vibration of said housing in the frequency domain.

10. An apparatus for analyzing the vibration of the housing of a disk device according to claim 9, wherein said excitation tester further includes:

a head vibration characteristic detection means for detecting the oscillation of said head with respect to time by carrying out an inverse Fourier transformation of the power spectrum of the residual vibration of said housing in the frequency domain.

11. An apparatus for analyzing the vibration of the housing of a disk device according to claim 10, wherein a dummy head is mounted on the head mount of said head actuator.

12. An apparatus for analyzing the vibration of the housing of a disk device according to claim 11, wherein two acceleration sensors similar to said first acceleration sensor are arranged in said housing, and wherein the rotational acceleration of said housing is determined from the difference between the outputs of said two acceleration sensors.

13. An apparatus for analyzing the vibration of the housing of a disk device according to claim 12, wherein said excitation tester further includes:

spindle imbalance assuming means for assuming an imbalance of the spindle motor for rotating the disk of said disk device;

means for calculating the moment of rotation about the center of gravity from the force generated by the imbalance of said spindle motor; and positional acceleration correcting means for multiplying said moment about the center of gravity by the response gain of said housing and determining an increment of the positional acceleration of said housing due to the deflection caused by said imbalance of said spindle motor.

14. An apparatus for analyzing the vibration of the housing of a disk device according to claim 13, wherein each means included in said excitation tester is configured as computer software.

15. An apparatus for analyzing the vibration of the housing of a disk device according to claim 9, wherein a dummy head is mounted on the head mount of said head actuator.

16. An apparatus for analyzing the vibration of the housing of a disk device according to claim 9, wherein two acceleration sensors similar to said first acceleration sensor are arranged in said housing, and wherein the rotational acceleration of said housing is determined from the difference between the outputs of said two acceleration sensors.

17. An apparatus for analyzing the vibration of the housing of a disk device according to claim 9, wherein said excitation tester further includes:

spindle imbalance assuming means for assuming an imbalance of the spindle motor for rotating the disk of said disk device;

means for calculating the moment of rotation about the center of gravity from the force generated by the imbalance of the spindle motor; and positional acceleration correcting means for multiplying said moment about the center of gravity by the response gain of said housing and determining an increment of the positional acceleration of said housing due to the deflection caused by the imbalance of said spindle motor.

18. An apparatus for analyzing the vibration of the housing of a disk device according to claim 9, wherein each means included in said excitation tester is configured as computer software.

* * * * *

UNITED STATES PATENT AND TRADEMARK OFFICE
CERTIFICATE OF CORRECTION

PATENT NO. : 6,101,453
DATED : August 8, 2000
INVENTOR(S) : Suwa et al.

It is certified that error appears in the above-indentified patent and that said Letters Patent is hereby corrected as shown below:

On the Face of the Patent:

Under "[57] ABSTRACT", line 11, please delete "n" and insert --an-- therefor.

In the Claims:

Column 12, line 28, please delete "an" and insert --a-- therefor.

Column 12, line 31, please delete "a" and insert --an-- therefor.

Signed and Sealed this

Twenty-fourth Day of April, 2001

*Attest:*

*Attesting Officer*

NICHOLAS P. GODICI

*Acting Director of the United States Patent and Trademark Office*